United States Patent [11] 3,594,851

| [72] | Inventor | Sidney C. Swatton<br>Thornton, Pa. |
|---|---|---|
| [21] | Appl. No. | 34,215 |
| [22] | Filed | May 4, 1970 |
| [45] | Patented | July 27, 1971 |
| [73] | Assignee | The Boeing Company<br>Seattle, Wash. |

[54] FAIL SAFE HINGE AND MOUNTING
13 Claims, 5 Drawing Figs.

[52] U.S. Cl. .................................................. 16/136,
287/100, 244/42, 308/217
[51] Int. Cl. ................................................. E05d 11/00
[50] Field of Search ........................................ 16/136,
140; 244/42 DB, 42 DA, 42 D, 42 DC, 88, 131;
308/207, 217; 287/100

[56] References Cited
UNITED STATES PATENTS
| 2,227,069 | 12/1940 | Bryant | 308/217 |
| 2,700,791 | 2/1955 | Vogev | 16/136 X |
| 3,140,066 | 7/1964 | Sutton et al. | 244/42 DC |
| 3,198,563 | 8/1965 | Steidl | 287/100 |
| 3,480,235 | 11/1969 | Multhopp | 244/42 DC |

*Primary Examiner*—Bobby R. Gay
*Assistant Examiner*—Peter A. Aschenbrenner
*Attorneys*—Albert W. Hilburger and Joseph M. Corr ABSTRACT: A hinge and mounting for connecting one structural member to another and particularly applicable in hinging a control surface to an aircraft structure. Two interlocked control surface brackets are interconnected by a bolt with two brackets extending from the aircraft structural member. A concave double roller bearing is housed within the brackets with the bolt passing through the center thereof. One-half of the bearing is confined between the structural member brackets and is not free to rotate. The other half of the bearing is restrained between the two control surface brackets and an enclosing spool which encircles the bearing and is held between the two control surface brackets. The outer half of the bearing is free to rotate by means of rollers with respect to the stationary inner half and bolt. An alternative version provides a second dry-bearing interposed between the spool and the outer half of the first bearing to permit fail safe operation of the hinge in case of seizure of the roller bearing.

PATENTED JUL 27 1971
3,594,851
SHEET 1 OF 2
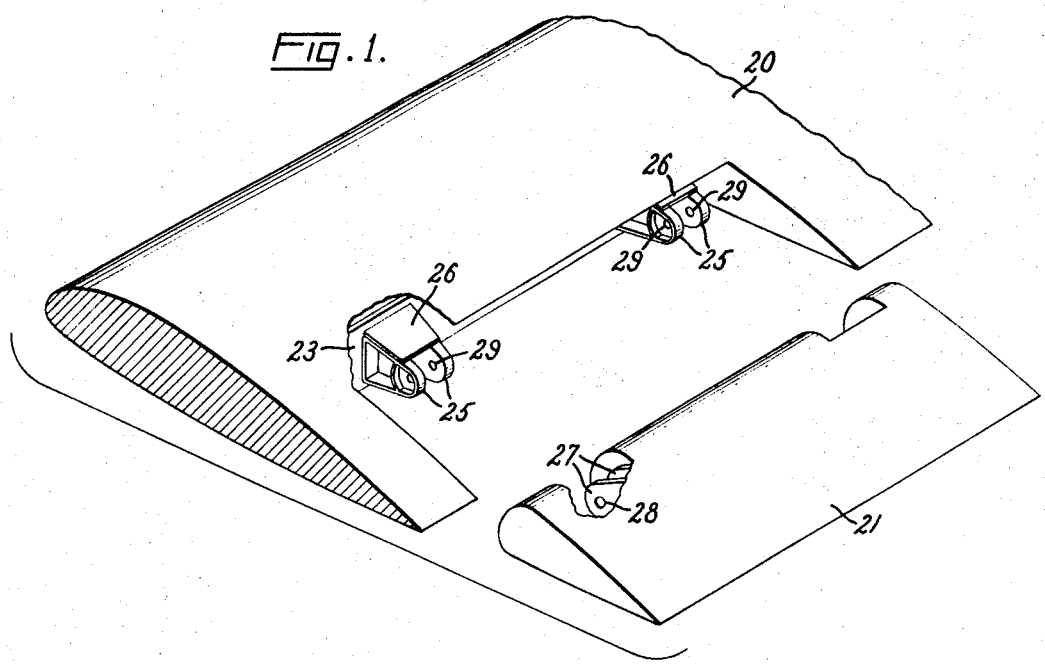
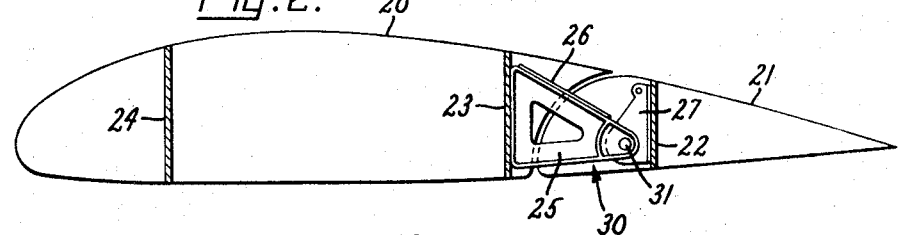
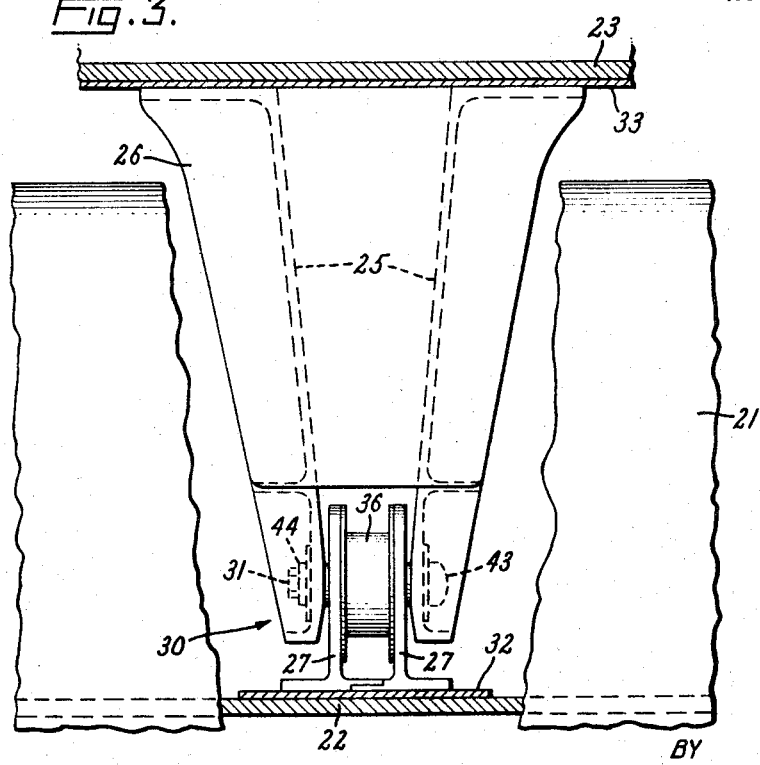
INVENTOR:
SIDNEY C. SWATTON,
BY Joseph M. Corr
ATTORNEY

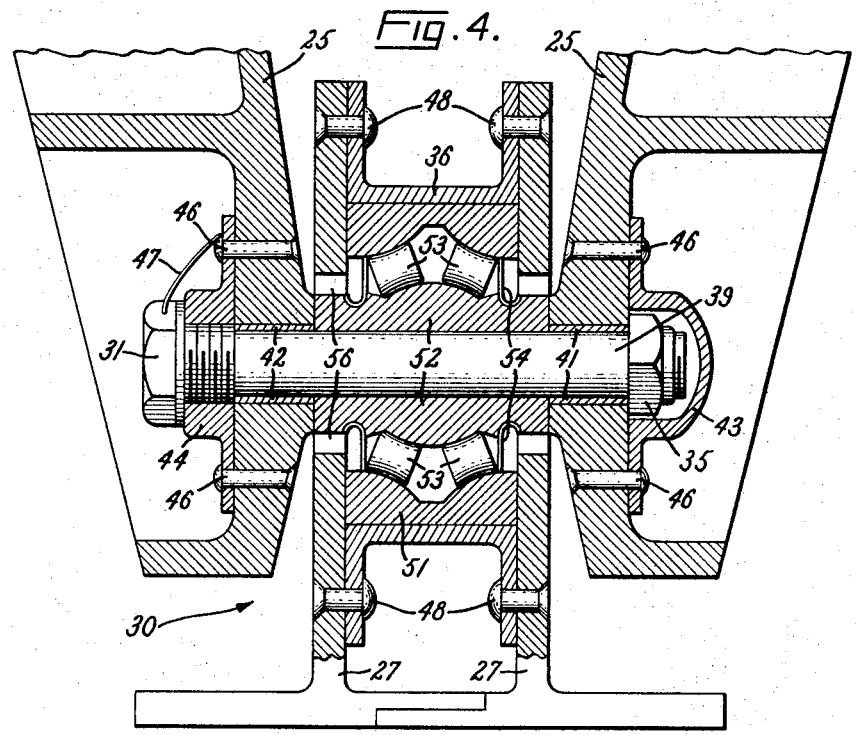
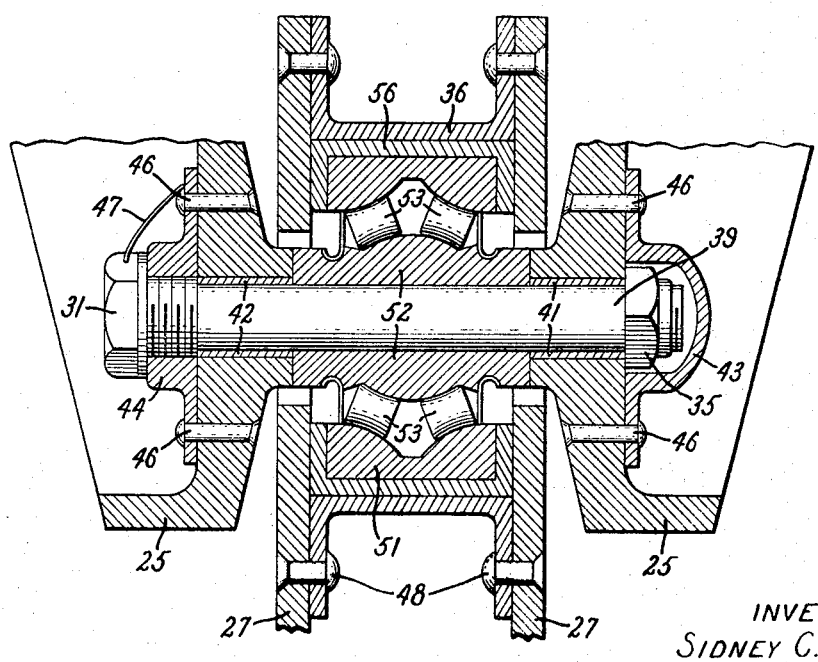

3,594,851

FAIL SAFE HINGE AND MOUNTING

BACKGROUND OF THE INVENTION

This invention relates to a hinge for connecting one structure to another and is especially suited for connecting aircraft control surfaces, i.e. ailerons, rudders, elevators, and flaperons to a structural member of the aircraft. In particular, the invention is related to a fail safe hinge which is designed to continue operating after structural damage to parts of the hinge. In addition the invention is related to a hinge mounting arrangement wherein the hinges are designed to self-align under heavy loads which can result from severe aerodynamic forces causing the control surface and aircraft structure, such as a wing, to bend and twist.

In the following discussion the type of hinges which will be described are those normally found on aircraft for connecting a control surface to a structural member, such as a wing. However, the hinge disclosed in this invention is clearly not restricted to aircraft and can be used in a variety of applications. Nevertheless for clarity and to illustrate the features and advantages of the invention, the discussion will primarily relate to aircraft applications.

One conventional hinge used in connecting a control surface to a wing usually comprises a single bracket extending from the wing and a single bracket extending from the aileron with the two being interconnected by a bolt. A fixed bearing is arranged around the bolt in a push-fit manner to enhance the hinging action. This naturally permits the control surface bracket to rotate with respect to the wing bracket and, therefore, the control surface can be moved in relation to the wing. It is obvious in this arrangement, however, that if either bracket breaks there is no longer a hinge and the control surface consequently is no longer connected to the wing so that control of the aircraft is lost.

In order to incorporate a certain amount of safety the conventional hinge has been modified to have two wing brackets with the control surface bracket between the two and again interconnected by means of a bolt with a fixed bearing. This is designed to add the safety feature wherein if one wing bracket breaks, the other will take the load. However, this is a minimum safety arrangement and, in addition, it is very likely that upon failure of one wing bracket, the bolt and bearing will be free to drop out and again the whole hinge is lost.

Taking the conventional hinge one step further, some are provided with two brackets extending from the wing and two brackets extending from the control surface. The remainder of the hinge is the same wherein the bolt interconnects the four brackets and a bearing is arranged around the bolt in a push-fit manner. This is designed for the purpose of providing a measure of safety for the contingency where either a wing bracket or control surface bracket breaks. However, this particular design also does not take into account the fact that normally when any one hinge breaks or fails there are no means to retain the bolt and bearing in place and when either or both drop out the hinge is lost. Of more importance, however, is the fact that the conventional hinge does not incorporate means for load transfer so that if a bracket breaks on one side of the hinge, the load normally carried by that side is not transferred to and carried by the other side of the hinge. Consequently, there still remains the danger in conventional hinges that if a bracket or the hinge bolt breaks the hinge is lost, resulting in loss of control of the control surface and of the aircraft.

In the conventional hinges, failure or jamming of the bearing results in failure or jamming of the entire hinge and no fail safe features are provided to correct and overcome such a situation.

In addition, the conventional hinges are normally mounted on aircraft in a manner which aggravates the dangers presented by this lack of fail safe features. Depending on the length of the wing or other structural member to which the control surface is mounted, the number of hinges will be different. However, an aircraft of a medium size will have a wing which requires several hinges to connect the control surface to the wing. When the wing is subjected to a heavy load, it deflects and constrains the control surface to bend with it via the hinges. As a result of this deflection the center line between hinges is no longer straight. This misalignment of the center line between hinges causes stiffening and ultimately could lead to jamming of the control surface resulting in loss of control of the aircraft.

One solution to this problem has been to divide the control surface into sections and connect these sections by means of universal joints. In this construction each section of the control surface has only two or three hinges and, consequently, the length between hinges is only half or less than on conventional wings and bending of the wing does not cause a significant misalignment of the center line between hinges. Nevertheless, the conventional hinges are still capable of jamming under these rather small misalignments of their center line so that improvements in the hinge construction appear necessary to avoid this jamming problem.

The conventional hinge arrangement also exhibits aerodynamic problems and possible fatigue within the structure when heavy loading is placed on the hinges by the twisting and bending moments described above.

It follows from this discussion that a hinge construction having fail safe features is very desirable so that should any one bracket, the bolt or the two in combination fail, or if the bearing jams, the hinge will remain intact and be fully operative. In addition, it is desirable to have a hinge system which has the capability to self-align in case of severe loading on the aircraft structure so that if the center line connecting the hinges becomes distorted because of heavy loading the hinges will self-align and control surface jamming is avoided.

SUMMARY OF THE INVENTION

It is therefore the prime object of the invention to provide a fail safe hinge which is designed to remain operable under conditions where conventional hinges normally fail. Therefore, it is an object to provide a fail safe hinge which can be subjected to substantial physical damage and yet maintain connection between two structures, such as between a control surface and a structural member of an aircraft.

Another object is to provide a fail safe hinge which possesses the property of being able to self-align with another hinge when the hinges are subjected to forces which tend to cause the center line between hinges to become misaligned.

Another object is to provide a mounting arrangement of the fail safe hinges to take advantage of this self-alignment feature, wherein two hinges are provided to connect a movable member to a stationary member.

It is a particular object to provide a fail safe hinge which can function in a stub axle manner upon fracture or failure of a bracket or the hinge bolt or both. In this regard, it is an object to provide means for transferring the load from one side of the hinge to the other. It is an additional object to provide a hinge which has two bearings to provide a fail safe hinge construction which can continue operating in case of seizure of the one bearing which is normally operative, or in case of a fracture of the bearing rollers, or in case of some other bearing failure.

It is another object of the invention to provide a hinge wherein a spool is captured between the two control surface brackets to permit load transfer from one side of the hinge to the other and enable the hinge to operate in stub axle fashion. A further object is to provide the novel combination of such a spool with a self-aligning bearing to provide fail safe features.

Other objects and advantages of this invention will become apparent after the more detailed description thereof wherein the invention provides a fail safe hinge which is basically constructed of four brackets, a spool, a bearing, and a bolt. These elements are arranged in a manner so that the hinge may be subjected to severe physical damage and remain operative under conditions which normally would result in loss of a conventional hinge. An alternative hinge of this invention has a second bearing incorporated therein to provide the fail safe feature wherein the hinge can continue operating in case the first bearing becomes jammed.

BRIEF DESCRIPTION OF THE DRAWINGS

FIG. 1 is a plan view of an airplane wing and its associated control surface aligned for attachment thereto by means of two hinges of this invention.

FIG. 2 is a sectional view of the wing of FIG. 1 at one of the hinges.

FIG. 3 is a top plan view of FIG. 2 with a portion of the control surface and of the wing broken away to expose the hinge.

FIG. 4 is a cross section of a hinge showing the various elements in detail.

FIG. 5 is a cross section similar to that of FIG. 4, but showing an alternate hinge construction.

DESCRIPTION OF THE PREFERRED EMBODIMENTS

As was stated previously, the hinge of this invention has many applications, but is described herein as applied to the control surface of an aircraft for purposes of clarity and ease of description. Therefore, the embodiment illustrated in the Figures and specifically described herein is not to be construed as limitative of this invention.

In the following discussion, the invention will be described in a preferred embodiment involving attaching a control surface to an aircraft structure. It is to be understood that the hinge can be used in other areas of the aircraft to connect the various control surfaces to their respective structural members, and therefore, the general term "control surface" encompasses ailerons, flaperons, elevators, and rudders.

FIG. 1 is a plan view schematically illustrating a portion of an aircraft wing and its associated control surface together with the wing and control surface brackets of the hinge of this invention. The Figure, therefore, illustrates the locations of the hinges while subsequent Figures show the detailed construction of the hinge. Portions of the wing and control surface have been broken away to expose the hinge brackets.

The wing 20 is shown having the conventional design with the control surface 21 shaped to mate with the wing and form a smooth airfoil trailing edge. The wing spars are numbered 23 and 24 while the control surface spar appears at 22. Two sets of wing brackets 25 are anchored to the spar 23 and are joined by a reinforcing metal plate 26. Complementary pairs of control surface brackets are anchored to the spar 22, with one pair of brackets shown at 27. Each pair of brackets 27 fits between each pair of wing brackets 25 and are adapted to be interconnected therewith by a bolt which passes through holes 28 and 29 provided in the brackets 27 and 25, respectively.

As noted previously, FIG. 1 shows only a portion of a wing, it being understood that a wing of substantial length would have two or more control surfaces 21 hinged thereto in a similar fashion. However, it is intended with this invention that several control surfaces be provided on a wing as illustrated in the Figure in order to avoid the use of a single long control surface connected to the wing by many hinges. Each control surface would be hinged to the wing by two hinges. In this way, misalignment of the center line between hinges occurring as a result of bending forces as discussed previously in substantially avoided. In addition, the hinges are designed to be self-aligning under such forces so that the possibility of jamming of the control surface is significantly reduced. If more than two hinges are used for each control surface, self-alignment among all hinges won't be achieved.

In FIG. 2, the control surface 21 has been joined to the wing 20 and the airfoil is sectionally depicted in side elevation in the area where the hinge 30 connects the two members to each other. Again, the details of the hinge construction do not appear in the Figure, but rather the manner in which the control surface 21 is hinged and mounted to the wing 20 is illustrated.

The wing bracket 25 and control surface bracket 27 are anchored to their corresponding metal spars 23 and 22. Anchoring is normally achieved by bolting the brackets to the spars and preferably a reinforcing plate is inserted between the spar and brackets to augment a solid anchoring. The brackets are joined together by a bolt, the head of which appears at 31. The reinforcing plate 26 extends substantially the length of brackets 27 and although not necessary to the invention, serves to provide rigidity to the bracket structure. The control surface is now free to move relative to the wing and thereby function in the normal manner. The actuating means which causes movement of the control surface is not shown since it is a conventional mechanism and forms no part of the invention.

In FIG. 3, a top plan view of FIG. 2 is illustrated wherein portions of the control surface 21 and wing 20 have been removed to expose the hinge 30 in more detail. The wing spar and control surface spar again appear as 22 and 23 with the wing brackets 25 and control surface brackets 27 respectively anchored thereto. As an aid in providing rigid anchoring of the brackets to the spars, metal reinforcing plates are interposed at 32 and 33 between the brackets and the respective spars. Such plates are not essential to the construction but serve the useful purpose of providing an additional measure of fail safety. In this respect, reinforcing metal plate 26 again joins the two wing brackets and aids the structural integrity thereof.

The wing and control surface brackets may be anchored to their respective spars by means of bolts or other suitable method. As shown in the Figure, the control surface brackets are deliberately made separate in themselves to ensure redundancy for fail safety but are stepped in such a manner as to allow the bracket bases to overlap and bolt together for added rigidity. The head of the hinge bolt is again shown as 31 while at the other end of the bolt is shown a steel cover 43 which covers the nut on the bolt. Captured between the control surface brackets is a spool 36 which houses the interior elements of the hinge. This spool is preferably light in weight and strong being normally made of titanium. However, other appropriate materials may be used such as wound boron or graphite. The spool preferably is riveted to the brackets 27 and serves an important purpose in this invention as will be seen shortly. In particular, the spool acts like a cantilever when one side of the hinge fails, e.g. as a result of a bracket being fractured, whereby the load from the defective side of the hinge is transferred through the spool to the good side of the hinge. This load transfer ability is the result of the unique design of the hinge of this invention.

Without going into further detail of the hinge construction and viewing it as illustrated in FIG. 3, the fail safe qualities provided by the hinge may be recognized. One apparent feature is the use of four hinge brackets which immediately insures a measure of safety by providing redundancy in load paths. In addition, the open space between each wing bracket and control surface bracket permits the control brackets to rotate laterally a few degrees so that the hinge is able to align itself by means of its self-aligning bearing with an adjacent hinge and consequently inhibit misalignment of the center line between the two hinges which attach the control surface to the wing. As a result, jamming of the control surface is deterred when heavy bending forces are exerted on the wing and control surface as noted previously. This ability to self-align will be noted again during the discussion about FIGS. 4 and 5. Therefore this invention provides the unique combination of a self-aligning bearing and a spool which can transfer loads so that the hinge can remain operational under rather extreme conditions.

Precaution is taken to provide locking means to prevent the nut 35 from coming loose and disengaging from the bolt as well as to prevent the bolt from falling out. With the bolt and nut locked together, various hinge failure conditions will be assumed which would normally be catastrophic when a conventional hinge is used, but will not cause such results when the hinge of this invention is used. The various locking means are better shown elsewhere in the Figures.

In FIG. 3 therefore, assume that either a single control surface bracket 27 or a single wing bracket 25 has broken. It is obvious that because of the presence of spool 36 which provides multiple paths for load transfer, the hinge is able to continue functioning with the three remaining brackets supporting the load. Of course, the brackets are constructed of material capable of withstanding the loads. In such an instance wherein a bracket fractures, the hinge bolt is said to act in stub axle fashion and it too is made of material strong enough to handle the increased loads.

Next consider the situation wherein a bracket breaks on both the wing and the control surface. Regardless of which combination of any two brackets is presumed broken, the hinge will continue functioning. The reader can convince himself of this fact by mentally envisioning the various combinations of one broken wing bracket and one broken control surface bracket and observing that in each situation the spool 36 will transfer the loads to the brackets remaining intact and the hinge bolt will function in stub axle manner. Therefore, the bolt will continue to join the unbroken wing bracket with the unbroken control surface bracket and the hinge will remain intact.

The situation wherein the bolt breaks at any point along its length may be better understood in relation to FIGS. 4 and 5 and will be discussed at that time. It can be generally stated at this point, however, that regardless of whether the bolt only breaks, or if the bolt and a single bracket break, the hinge will continue to be operative with the bolt remaining as a stub axle and the spool transferring loads as previously described. Also, in certain instances, the bolt may break together with one wing and one control surface bracket and the hinge will continue to be operative.

Referring to FIG. 4, the hinge 30 is shown in elevational cross-section illustrating the interior components in detail. The wing brackets again appear at 25 while the control surface brackets, with their bases overlapping, appear as 27. Shown passing through the center of the hinge is the bolt 39 with the bolt head and nut appearing at 31 and 35 respectively. Sleeve push fit bearings 41 and 42 surround the bolt where it passes through the wing brackets. A stainless steel cover over the nut 35 is shown at 43 while a stainless steel threaded housing 44 appears under the bolt head 31. The housings are secured to the wing brackets 25 by rivets 46 and aid in protecting the bolt and nut from corrosion as well as aiding in preventing the nut and bolt from becoming loose and dropping off. Locking wire 47 is also provided to restrain the bolt head from turning.

Shown secured by rivets 48 to the control surface brackets 27 is the spool 36. Immediately inside the spool is outer bearing 51 separated from inner bearing 52 by roller members 53. Outer bearing 51 is captured between control surface brackets 27 while inner bearing 52 is held between wing brackets 25 and surrounds the hinge bolt 39. The inner bearing is stationary with respect to the outer bearing which, together with the control surface brackets 27 and spool 36, rotates about the inner bearing and bolt by means of rollers 53.

It should be noted here that although a concave double roller bearing is preferred in this embodiment, it is contemplated that other universal bearings can be used. A universal bearing is desired since it enables the hinge to adapt to severe loads and bending forces and will not easily jam under such forces but is capable of self-alignment.

Oil seals 54 seal off the roller members from the open slot 56 between the control surface brackets and the inner bearing. The slot 56 is necessary to permit rotation about the inner bearing while the free space between the wing brackets and the control surface brackets permits lateral movement of the brackets whereby the hinge is aided in self-aligning under bending forces as noted earlier. As shown in the Figure, the particular bearings used are of the self-aligning type wherein they are designed to respond to bending or deflection of the spars to which the hinge is mounted and in doing so, each hinge aligns itself with the adjacent hinge.

Both inner and outer bearing members 51 and 52 are preferably made of steel as are the rollers 53. The bolt 39 is made of steel and as previously noted, selection of materials is determined in part by the size of the parts and the anticipated loads to which they will be subjected.

It can readily be observed in FIG. 4 that if the bolt 39 fractures or shears at some point between the control surface brackets 27, then each section of the bolt will act as a stub axle and operation of the hinge will not be affected. In such an instance, the hinge also will continue operating if one bracket alone or if any combination of one wing and one control surface bracket fractures or fails. Therefore, such redundancy in load paths provides excellent fail safe features in the hinge.

If the bolt fractures at some point outside the area between control surface brackets 27, the hinge will continue operating normally. If the wing bracket on the same side of the hinge where the bolt fractures also breaks, the hinge will continue functioning even if one of the control surface brackets fails. Thus, various combinations of failures can occur and the hinge will remain operative, so long as a load path exists between one control surface bracket and one wing bracket.

FIG. 5 depicts an alternate hinge of this invention with an additional fail safety feature incorporated therein. The majority of elements are identical to those in the other Figures and common reference numerals have been retained. Thus, the wing brackets 25 and control surface brackets 27 are interconnected by the bolt 39 and nut 31. Between control surface brackets 27 and secured thereto by rivets 48 is spool 36, inside of which are the inner hinge members.

Therefore, a stationary inner bearing 52 surrounds bolt 39 and is held captured between wing brackets 25. Roller members 53 are located between inner bearing 52 and the outer bearing 51. The distinguishing feature between the hinge of FIG. 5 and that of FIG. 4 appears at this point wherein a dry bearing surface 56 is interposed between outer bearing 51 and control surface brackets 27. This dry bearing can be selected from a variety of materials such as a phosphor bronze material impregnated with graphite. Suitable composite plastic materials can also be utilized if desired.

The frictional force between dry bearing 56 and outer bearing 51 is such that in normal operations, the control surface brackets 27, dry bearing surface 56 and outer bearing 51 rotate about inner bearing 52 and bolt 39 by means of rollers 53. All the fail safe characteristics described in the earlier Figures are also embodied in the alternate hinge which has an additional fail safe feature provided by the dry bearing surface 56. With the provision of the dry bearing surface, redundancy of hinge bearing is incorporated into the hinge.

For example, if in FIG. 4 the hinge bearing comprising outer and inner bearing members 51 and 52 becomes jammed or otherwise locked so that the outer bearing does not rotate about the inner one, the hinge becomes inoperative whereby the control surface becomes jammed and control thereover is lost. Such locking of the bearing can occur as a result of fracture of one or more of roller members 53. Viewing FIG. 5, and assuming the situation just described wherein one or more of roller members 53 has fractured, it can be appreciated that the alternate hinge shown will not jam and be rendered inoperative. In the instance where seizure of inner and outer bearings 52 and 51 occurs, sufficient force need only be exerted to overcome the frictional grip between outer bearing 51 and dry bearing 56. When this occurs, the dry bearing serves as the hinge bearing wherein spool 36 and control surface brackets 27 rotate about seized outer bearing 51. The end effect therefore is that control surface brackets 27 continue to be hinged to wing brackets 25 and to rotate with respect thereto using dry bearing surface 56 as the hinge bearing. Consequently, the hinge of FIG. 5 has a second hinge bearing incorporated therein and is capable of continued operation in the event of seizure of the primary hinge bearing which comprises the inner and outer bearing members 51 and 52.

What has been described are preferred embodiments of this invention. Modifications thereto may be perceived by those

What I claim is:

1. A hinge for connecting a first member to a second member to permit relative movement therebetween and comprising in combination a first pair of hinge brackets mountable on said first member, a second pair of hinge brackets mountable on said second member, coupling means interconnecting said four brackets, universal bearing means comprising inner bearing means captured between said first pair of brackets and surrounding said coupling means and being stationary therewith and outer bearing means captured between said second pair of brackets, and housing means captured between said second pair of brackets and housing said inner and outer bearing means, whereby said second pair of brackets, said housing and said outer bearing means are adapted to move together relative to said bearing means and said first pair of brackets.

2. A hinge of claim 1 wherein said second pair of brackets is adapted to be positioned between said first pair of brackets, and wherein said housing means is a spool which is adapted to provide transfer load paths for transferring loads from one side of said hinge to the other side.

3. A hinge of claim 1 wherein the bases of said second pair of brackets are adapted to be joined together so that one base overlays the other and is held in rigid contact therewith.

4. A hinge of claim 1 wherein said inner and outer bearing means together comprise a concave double roller bearing.

5. A hinge of claim 2 wherein interposed between said spool and said outer bearing means is another bearing surface for permitting movement of said spool and said second pair of brackets with respect to said outer bearing means when said outer bearing means becomes inoperative and is not free to move relative to said inner bearing means.

6. A hinge of claim 1 wherein said second pair of brackets are positioned between said first pair of brackets and spaced therefrom to permit lateral movement of said second pair of brackets with respect to said first pair of brackets to aid in enabling said hinge to self-align under load.

7. A hinge for connecting a control surface to a structural member of an aircraft and comprising in combination two brackets attached to and extending from said member, two brackets attached to and extending from aid surface, coupling means comprising a bolt coupling said brackets to form two beams between said surface and said member, a spool mounted between said surface brackets, a concave double roller bearing within said spool, said bolt passing through the center of said bearing, said bearing comprising an inner stationary first section confined about said bolt and captured by said member brackets, roller members, and a rotatable outer section adjacent said spool and captured between said surface brackets, said outer section being rotatable with respect to said stationary inner section by means of said roller members to enable said surface brackets to rotate with respect to said member brackets.

8. A hinge of claim 7 wherein said spool is riveted to said surface brackets to provide means for transferring loads across said hinge from said side to the other.

9. A hinge comprising, in combination:
a first pair of brackets mountable to a first member;
a second pair of brackets mountable to a second member;
coupling means passing through holes in said bracket pairs and interconnecting them to form two substantially parallel sides of said hinge;
universal bearing means comprising a first and a second section;
said first bearing section being captured by said first pair of brackets and being stationary with said coupling means;
said second bearing section being captured by said second pair of brackets and rotatable with respect to said first bearing section to enable said second pair of brackets to rotate relative to said first pair of brackets;
housing means surrounding and enclosing said universal bearing means and attached to said second pair of brackets and held therebetween; and
bearing surface means interposed between said second section of said universal bearing and both said housing means and said second pair of brackets.

10. A hinge of claim 9 wherein said bearing surface means is a metallic dry bearing adapted to permit rotation of said housing means and said second pair of brackets with respect to said universal bearing means and said first pair of brackets upon failure of said universal bearing means.

11. A hinge of claim 10 wherein said dry bearing is made of a composite plastic material.

12. A hinge of claim 9 wherein said universal bearing means is a concave double roller bearing and said housing is a spool rigidly attached to said second pair of brackets.

13. A hinge of claim 9 wherein said universal bearing means is a concave double roller bearing, said second pair of brackets is positioned between and spaced from said first pair of brackets whereby said second pair of brackets are free to move laterally when subjected to loads and whereby said hinge is adapted to self-align with an adjacent hinge mounted between said first and second members.